Oct. 26, 1943.   A. ROSCH   2,333,044
GOVERNING MECHANISM
Filed May 7, 1941

Inventor:
Arthur Rosch,
by Harry E. Dunham
His Attorney.

Patented Oct. 26, 1943

2,333,044

UNITED STATES PATENT OFFICE 2,333,044

GOVERNING MECHANISM

Arthur Rosch, Brieselang, near Nauen, Germany, assignor to General Electric Company, a corporation of New York Application May 7, 1941, Serial No. 392,366
In Germany May 28, 1940

1 Claim. (Cl. 264—15)

The present invention relates to governing mechanisms of the type including a fluid pressure system for conducting fluid under pressure to a servomotor and a centrifugal type governor for controlling the flow of fluid through the system to the motor in response to speed changes of a machine to be controlled. The invention is of particular signficance in connection with emergency control mechanisms including an emergency centrifugal type speed governor to control the flow of fluid under pressure to a servomotor for quickly shutting the inlet valve of an elastic fluid turbine during emergency conditions.

Governing mechanisms in elastic fluid power plants, especially when used on ships or locomotives, are subject to considerable vibration which at times may lead to movement of pilot valves and like elements.

The object of the present invention is to provide a control mechanism in which pilot valves for controlling the flow of fluid to servomotors are eliminated and which accordingly is less sensitive to vibrations and at the same time is simple and may be produced at comparatively low cost.

This is accomplished in accordance with my invention by the provision of a governing mechanism which includes a fluid pressure system for conducting fluid under pressure to a servomotor and a centrifugal type speed governor driven by the prime mover or like machine to be controlled and having a flyweight for directly affecting or controlling the fluid flow through the system to the motor. The direct control of the fluid flow may be accomplished by the provision of a system which includes a conduit with two spaced sections to form a free jet of fluid discharged from one section into the other section and a centrifugal type governor with a flyweight in cooperative relation with the free jet.

For a better understanding of what I believe to be novel and my invention, attention is directed to the following description and the claim appended thereto in connection with the accompanying drawing.

Figure 1:
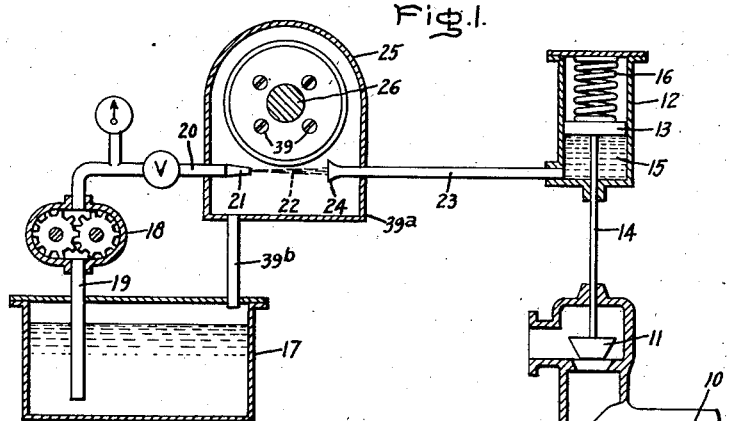
Figure 2:
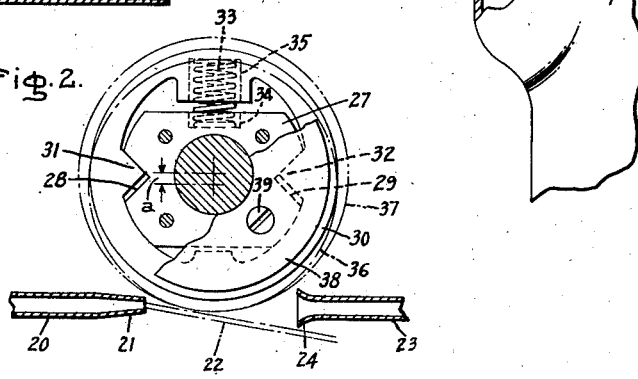
Figure 3:
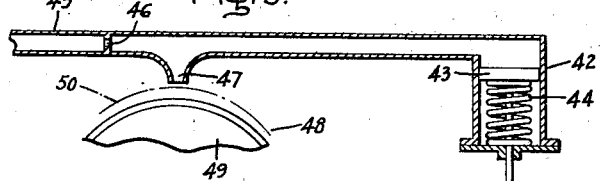
Figure 4:
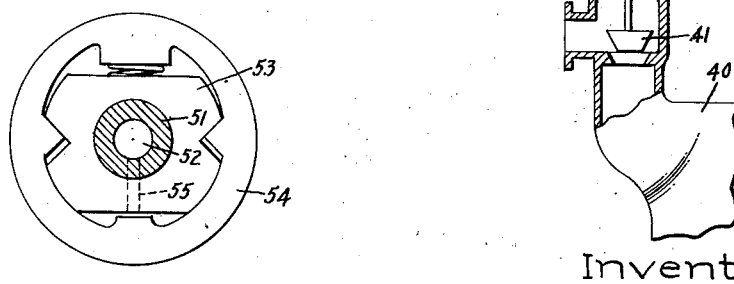

In the drawing Fig. 1 illustrates a governing mechanism embodying my invention; Fig. 2 is an enlarged detail view of Fig. 1, and Figs. 3 and 4 illustrate two modifications according to my invention.

The arrangement shown in Fig. 1 comprises an elastic fluid turbine 10 with an emergency valve 11 which is normally open and during emergency condition has to be quickly shut. The valve 11 is held open by means of a servomotor 12 having a piston 13 with a stem 14 connected to the valve. The piston is forced upward by fluid under pressure 15 conducted to the lower portion of the cylinder against the biasing force of a spring 16 which effects closing of the valve as the fluid pressure is released. Fluid under pressure is supplied to the servomotor 12 by a fluid pressure system including a tank 17 for containing fluid such as oil and means for conducting such fluid under pressure to the servomotor. This means includes a positive displacement pump 18, driven by any suitable agency, for instance, the turbine 10, with an inlet conduit 19 for receiving fluid from the tank 17. The pump discharges into a conduit or conduit section 20 which has a free end forming a nozzle 21 for directing a jet of fluid 22 into a second conduit or conduit section 23 having a flared inlet portion 24 aligned with and spaced from the nozzle 21. With this arrangement a free jet of fluid under pressure is normally discharged from the nozzle 21 of the first conduit section into the flared inlet portion 24 of the second conduit section, which latter is connected to the servomotor 12.

A centrifugal type speed governor 25 is arranged in cooperative relation with the fluid pressure system for directly interrupting or controlling the jet 22 normally produced by said system upon a predetermined increase in speed. This emergency governor comprises a shaft 26 driven from the turbine shaft. A flyweight support 27 is secured to the shaft 26 and forms two diametrically opposite knife-edge bearings 28, 29. A ring type flyweight 30 surrounds the support and has knife edges 31, 32 projecting into and engaging the knife-edge bearings 28 and 29, respectively. The centrifugal flyweight is normally biased into the position indicated in Fig. 2 by means of a biasing spring 33 engaging opposite recesses 34 and 35 in the support and the flyweight respectively. The ring, as clearly shown in Fig. 2, is of non-uniform thickness. When viewed in Fig. 2 the lower portion diametrically opposite the spring 33 is heavier than the upper one adjacent the spring 33.

During operation the flyweight normally assumes the position indicated in full line in Figs. 1 and 2. As the speed increases and reaches emergency magnitude the flyweight is forced outward by the action of centrifugal force by a distance $a$ and then assumes the position indicated by dash-dotted line 36 in which it rotates like an eccentric about the center of the shaft 26. The circle along which the outer point (that is, the point diametrically opposite the spring) rotates is indicated in Fig. 2 by an interrupted line 37.

The flyweight or ring 30 is held in position axially by means of two plates 38 secured to opposite sides of the support 27 by means of screws 39. The governor is enclosed in a casing 39a with a discharge conduit 39b connected to the tank 17 whereby operating fluid discharged into the casing 39a is returned through the conduit 39b into the tank 17.

During operation, outward movement of the flyweight or ring upon a predetermined increase in speed causes interruption of the jet of fluid flowing from the conduit section 20 into section 23 whereby the fluid pressure in the servomotor 12 drops and the fluid is discharged from the servomotor through the flared opening 24 of the conduit section 23. This causes downward movement of the piston 13 by the action of the spring 16 and closing of the emergency valve 11.

The arrangement of Fig. 3 comprises a turbine 40 with a valve 41 for controlling the flow of operating fluid thereto. The valve is moved by means of a servomotor 42 having a piston 43. In this modification the piston 43 is held in the upper or opening position by means of a compression spring 44 and forced downward into closing position by fluid under pressure conducted to the upper side of the piston. The fluid pressure system includes a conduit 45 connected to the upper end of the servomotor 42 and having an orifice 46 and a discharge or drain opening 47 at a point intermediate the orifice 46 and the servomotor 42. The discharge of fluid under pressure through the opening 47 is controlled by a centrifugal type speed governor 48 with a flyweight 49.

During normal operating condition the flyweight is in the position indicated in full lines and during emergency condition that is, upon a predetermined increase in speed, the flyweight is moved into the position indicated by dash-dotted line 50. Thus, the flyweight 49 normally permits substantially free discharge of fluid from the opening 47 so that the fluid pressure in the upper part of the servomotor 42 is at minimum and permits the piston to be held in its upper end position by the action of the spring 44. Upon a predetermined increase in speed the flyweight 49 is moved towards the opening 47 into the position 50 in which the flyweight forms a substantial restriction to the discharge of fluid from the opening 47. The fluid pressure in the upper part of the servomotor 42 thereby is built up and causes downward movement of the piston 43 against the biasing force of the spring 44, resulting in closing of the valve 41.

The arrangement of Fig. 4 comprises a shaft 51 with a central bore 52. A knife-edge support 53 corresponding to the support 27 of Fig. 2 is secured to the shaft and engaged by a centrifugal flyweight 54 corresponding to the flyweight 30 of Fig. 2. The support 53 and the shaft 51 are formed with a radial bore 55 which at its inner end communicates with the bore 52 of the shaft and has an outer end adjacent a portion of the flyweight 54. The central bore 52 of the shaft and the radial bore 55 form part of the fluid pressure system for conducting fluid under pressure to a servomotor, not shown, the bore 52 forming part of a channel corresponding to the conduit 45 in Fig. 3 and the radial bore 55 contributing an opening corresponding to the opening 47 in Fig. 3.

During normal operating condition with the flyweight positioned relative to the shaft, as indicated in Fig. 4, a definite pressure is established in the servomotor. Upon a predetermined increase in speed the flyweight is forced outward by the action of centrifugal force whereby the restriction to flow of fluid from the central bore 52 through the radial bore 55 is reduced and causes a drop in fluid pressure in the servomotor.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

Centrifugal type speed governor comprising a rotatable shaft, a support fastened to the shaft and having diametrically opposite knife edge recesses, an annular flyweight surrounding the shaft and having diametrically opposite knife edge portions projecting into and engaging the walls of the recesses, and spring means between the flyweight and the shaft to bias the ring against centrifugal force in a direction perpendicular to the diameter through the recesses, the knife edge points of said portions being spaced from the knife edge points of the corresponding recesses.

ARTHUR ROSCH.